United States Patent
Horiuchi et al.

(10) Patent No.: US 10,950,869 B2
(45) Date of Patent: Mar. 16, 2021

(54) FUEL CELL ELECTRODE CATALYST AND METHOD FOR PRODUCING THE SAME

(71) Applicants: CATALER CORPORATION, Kakegawa (JP); TOYOTA JIDOSHA KABUSHIKI KAISHA, Toyota (JP)

(72) Inventors: Yousuke Horiuchi, Kakegawa (JP); Tomoaki Terada, Kakegawa (JP); Akihiro Hori, Kakegawa (JP); Nobuaki Mizutani, Toyota (JP); Hiroo Yoshikawa, Toyota (JP); Yusuke Itoh, Nagoya (JP)

(73) Assignees: Cataler Corporation, Kakegawa (JP); Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 15/521,037

(22) PCT Filed: Oct. 23, 2015

(86) PCT No.: PCT/JP2015/079926
§ 371 (c)(1),
(2) Date: Apr. 21, 2017

(87) PCT Pub. No.: WO2016/063968
PCT Pub. Date: Apr. 28, 2016

(65) Prior Publication Data
US 2017/0338495 A1    Nov. 23, 2017

(30) Foreign Application Priority Data

Oct. 24, 2014   (JP) .................. 2014-216946

(51) Int. Cl.
*H01M 4/92*     (2006.01)
*H01M 4/88*     (2006.01)
(Continued)

(52) U.S. Cl.
CPC ............. *H01M 4/926* (2013.01); *H01M 4/86* (2013.01); *H01M 4/88* (2013.01); *H01M 4/90* (2013.01);
(Continued)

(58) Field of Classification Search
CPC ........ H01M 4/926; H01M 4/921; H01M 4/96; H01M 4/90; H01M 4/88; H01M 4/86;
(Continued)

(56) References Cited

U.S. PATENT DOCUMENTS

| 5,876,867 A | 3/1999 | Itoh et al. |
| 8,293,675 B2 | 10/2012 | Kotrel et al. |

(Continued)

FOREIGN PATENT DOCUMENTS

| CN | 101990462 A | 3/2011 |
| EP | 2 053 675 A1 | 4/2009 |

(Continued)

OTHER PUBLICATIONS

Partial Translation of the Written Opposition submitted by applicant dated Jul. 10, 2018 (Year: 2018).*

(Continued)

*Primary Examiner* — Milton I Cano
*Assistant Examiner* — Philip A. Stuckey
(74) *Attorney, Agent, or Firm* — Finnegan, Henderson, Farabow, Garrett & Dunner, LLP

(57) ABSTRACT

An object of the present invention is to achieve both high initial performance and durability performance of a fuel cell. Such object can be achieved by using a fuel cell electrode catalyst that includes a solid carbon carrier and an alloy of platinum and cobalt supported on the carrier.

10 Claims, 4 Drawing Sheets

(51) Int. Cl.
 H01M 4/86 (2006.01)
 H01M 4/90 (2006.01)
 H01M 4/96 (2006.01)
 H01M 8/10 (2016.01)
(52) U.S. Cl.
 CPC ............ *H01M 4/92* (2013.01); *H01M 4/921* (2013.01); *H01M 4/925* (2013.01); *H01M 4/96* (2013.01); *H01M 8/10* (2013.01); *Y02E 60/50* (2013.01); *Y02P 70/50* (2015.11)
(58) Field of Classification Search
 CPC .......... H01M 4/92; H01M 8/10; H01M 4/925; Y02E 60/50; Y02P 70/50
 See application file for complete search history.

(56) References Cited

U.S. PATENT DOCUMENTS

| | | | |
|---|---|---|---|
| 2005/0238936 | A1 | 10/2005 | Cho |
| 2007/0087261 | A1* | 4/2007 | Endoh ................ H01M 4/8605 429/483 |
| 2009/0092888 | A1* | 4/2009 | Takahashi ........... H01M 4/8842 429/430 |
| 2009/0099009 | A1* | 4/2009 | Takahashi ........... H01M 4/8842 502/101 |
| 2011/0195339 | A1* | 8/2011 | Iijima ................ H01M 4/8605 429/484 |
| 2012/0107724 | A1 | 5/2012 | Nagami et al. |
| 2013/0244137 | A1 | 9/2013 | Tada et al. |

FOREIGN PATENT DOCUMENTS

| | | |
|---|---|---|
| JP | H10-69914 A | 3/1998 |
| JP | 10-92441 | 4/1998 |
| JP | 2003-142112 A | 5/2003 |
| JP | 2005-166409 | 6/2005 |
| JP | 2005-317546 | 11/2005 |
| JP | 2009-140657 | 6/2009 |
| JP | 4362116 B2 | 11/2009 |
| JP | 2010-027364 A | 2/2010 |
| JP | 2010-253408 | 11/2010 |
| JP | 2011-003492 A | 1/2011 |
| JP | 2012-124001 | 6/2012 |
| JP | 2012-236138 | 12/2012 |
| JP | 2012-248365 | 12/2012 |
| JP | 2013-252483 | 12/2013 |
| WO | WO 2007/119640 A1 | 10/2007 |

OTHER PUBLICATIONS

Waldecker, J. (Jun. 16, 2014). Pt—Co/C Catalysts: PEMFC Performance and Durability. Pt—Co/C Catalysts: PEMFC Performance and Durability. https://www.energy.gov/sites/prod/files/2014/07/f17/fcto_cwg_june2014_waldecker.pdf Accessed on Jul. 23, 2020 (Year: 2014).*

J.R.C. Salgado et al., "Carbon Supported Pt—Co Alloys as Methanol-Resistant Oxygen-Reduction Electrocatalysts for Direct Methanol Fuel Cells," Applied Catalysis B: Environmental, 57 (2005) pp. 283-290.

E. Antolini et al., "Effects of Geometric and Electronic Factors on ORR Activity of Carbon Supported Pt—Co Electrocatalysts in PEM Fuel Cells," International Journal of Hydrogen Energy, 30 (2005) pp. 1213-1220.

Hideyuki Hisashi, "Current State of Electroconductive Carbonbtack," Mikuni Color Ltd., 2007.

* cited by examiner

FUEL CELL ELECTRODE CATALYST AND METHOD FOR PRODUCING THE SAME

CROSS-REFERENCE TO RELATED APPLICATIONS

This application is a national phase application of International Application No. PCT/JP2015/079926, filed Oct. 23, 2015, and claims the priority of Japanese Application No. 2014-216946, filed Oct. 24, 2014, the content of both of which is incorporated herein by reference.

TECHNICAL FIELD

The present invention relates to a fuel cell electrode catalyst and a method for producing the same.

BACKGROUND ART

Fuel cells are environmentally friendly power generating devices from which power can be extracted continuously by supplying a fuel thereto. With an increasing interest in the protection of the global environment in recent years, fuel cells have been widely expected to be developed. Further, having high power generation efficiency and thus allowing a reduction in the size of systems, fuel cells are expected to be used in a variety of fields, such as personal computers or portable devices like portable phones, or vehicles like automobiles or railway vehicles.

A fuel cell has a pair of electrodes (cathode and anode) and an electrolyte, and each electrode includes a carrier and an electrode catalyst, which is made of a catalytic metal, supported on the carrier. Carbon is typically used as a carrier in the conventional fuel cells. In addition, platinum or a platinum alloy is typically used as a catalytic metal.

In order to improve the performance of a fuel cell, it is necessary to increase the activity of an electrode catalyst. A number of techniques that are intended to improve the activity have been reported (for example, see Patent Literatures 1 to 7).

CITATION LIST

Patent Literature

Patent Literature 1: JP 2012-124001 A
Patent Literature 2: JP 2013-252483 A
Patent Literature 3: JP 2012-248365 A
Patent Literature 4: JP 2012-236138 A
Patent Literature 5: JP 2005-317546 A
Patent Literature 6: JP 2005-166409 A
Patent Literature 7: JP 2009-140657 A

SUMMARY OF INVENTION

Technical Problem

Conventionally, the initial performance of a fuel cell has been improved by using an electrode catalyst that includes a carbon carrier and an alloy of platinum (Pt) and cobalt (Co) (hereinafter referred to as a "PtCo alloy") finely supported on the carrier. However, an electrode catalyst that includes a PtCo alloy will have Co eluted in a long-term durability test and thus will increase proton resistance of the fuel cell. That is, using a PtCo alloy can improve the initial performance of a fuel cell, but will decrease the durability performance, which is problematic.

To address such a problem, for example, an attempt to decrease the proportion of Co in the PtCo alloy or an attempt to perform acid treatment on the electrode catalyst so as to suppress elution of Co has been made. Nevertheless, it has been difficult to sufficiently suppress elution of Co.

In view of the foregoing, an object of the present invention is to achieve both high initial performance and durability performance of a fuel cell.

Solution to Problem

The inventors have conducted concentrated studies and found the following.

When a PtCo alloy is supported on a hollow carbon carrier, which has been conventionally used, part of the PtCo alloy will be contained within the hollow carbon carrier. In such a case, even if acid treatment for suppressing elution of Co is performed, it would be difficult to sufficiently treat the PtCo alloy contained within the carrier. Consequently, Co becomes likely to be eluted from the PtCo alloy contained within the carrier.

Therefore, in the present invention, a solid carbon carrier is used instead of a hollow carbon carrier, so that a PtCo alloy is prevented from being contained within the carrier. Accordingly, it becomes possible to sufficiently perform acid treatment on the PtCo alloy and thus suppress elution of Co. Consequently, it becomes possible to achieve both high initial performance and durability performance of the fuel cell.

It was also found that the initial performance and durability performance of the fuel cell are further improved when Pt and Co have a specific molar ratio. In addition, it was also found that the initial performance and durability performance of the fuel cell are further improved when the PtCo alloy has a specific average particle diameter.

Further, it was also found that performing acid treatment under appropriate conditions can sufficiently remove Co which does not contribute to reactions, and thus can further suppress elution of Co.

That is, the present invention includes the following embodiments.

[1] A fuel cell electrode catalyst comprising a solid carbon carrier; and an alloy of platinum and cobalt supported on the carrier.
[2] The fuel cell electrode catalyst according to [1], in which the molar ratio of platinum to cobalt in the alloy is 4 to 11:1.
[3] The fuel cell electrode catalyst according to [1] or [2], in which the average particle diameter of the alloy is 3.5 to 4.1 nm.
[4] The fuel cell electrode catalyst according to any one of [1] to [3], in which the degree of dispersion of the alloy measured through small-angle X-ray scattering is less than or equal to 44%.
[5] The fuel cell electrode catalyst according to any one of [1] to [4], in which the catalyst is subjected to acid treatment at 70 to 90° C.
[6] The fuel cell electrode catalyst according to any one of [1] to [5], in which the amount of cobalt to be eluted is less than or equal to 115 ppm.
[7] A fuel cell comprising the fuel cell electrode catalyst according to any one of claims [1] to [6].
[8] A method for producing a fuel cell electrode catalyst, comprising a supporting step of causing platinum and cobalt to be supported on a solid carbon carrier; and an alloying step of alloying the platinum and the cobalt supported on the solid carbon carrier.

[9] The production method according to [8], in which the supporting step includes causing the platinum and the cobalt to be supported at a molar ratio of 2.5 to 6.9:1.
[10] The production method according to [8] or [9], in which the alloying step includes alloying the platinum and the cobalt at 700 to 900° C.
[11] The production method according to any one of [8] to [10], further comprising an acid treatment step of subjecting the alloy of the platinum and the cobalt supported on the solid carbon carrier to acid treatment at 70 to 90° C.

Advantageous Effects of Invention

According to the present invention, both high initial performance and durability performance of a fuel cell can be achieved.

The present specification contains the descriptions of the specification and/or drawings of the Japanese patent application JP 2014-216946 that serves as a basis for priority claim of the present application.

DESCRIPTION OF EMBODIMENTS

<Fuel Cell Electrode Catalyst>

Figure 1:
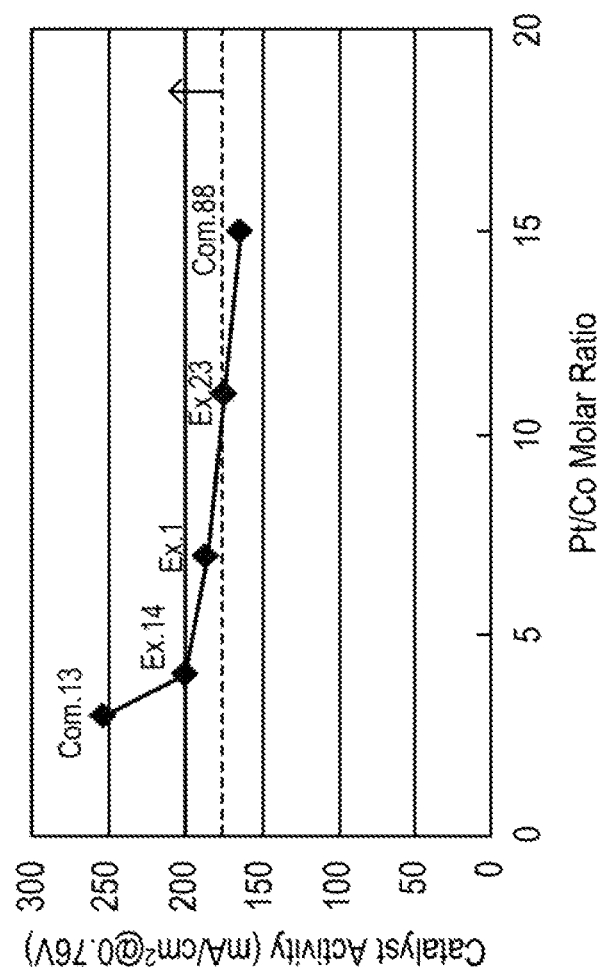
FIG. 1 illustrates the relationship between the Pt/Co molar ratio and catalyst activity.

An embodiment of the present invention relates to a fuel cell electrode catalyst (hereinafter also simply referred to as an "electrode catalyst") that comprises a solid carbon carrier and a PtCo alloy supported on the carrier.

In the present embodiment, a solid carbon carrier is used instead of a hollow carbon carrier, so that a PtCo alloy can be prevented from being contained within the carrier. Accordingly, it becomes possible to sufficiently perform acid treatment on the PtCo alloy and thus suppress elution of Co. Consequently, it becomes possible to achieve both high initial performance and durability performance of the fuel cell.

The solid carbon is a carbon that has less voids inside the carbon in comparison with hollow carbon. Specifically, the solid carbon is a carbon in which the rate of the outer surface area based on t-Plot (which is the surface area of the outside of the particles calculated from the particle size) relative to the BET surface area determined through $N_2$ adsorption (t-Plot surface area/BET surface area) is greater than or equal to 40%.

Examples of solid carbon include carbon described in JP 4362116 B. Specifically, acetylene black whose specific surface area is 500 to 1100 $m^2/g$ and whose crystal layer thickness (Lc) measured through X-ray diffraction is 15 to 40 Å is given as an example. More specifically, DENKA BLACK (registered trademark) produced by Denka Company Limited. is given as an example.

The average particle diameter of the solid carbon carrier is preferably less than or equal to 30 μm, more preferably, less than or equal to 13 μm, or particularly preferably, less than or equal to 10 μm. The lower limit of the average particle diameter is 0.01 μm or 0.1 μm, for example. It is also possible to define a new range by appropriately combining the aforementioned upper limit and lower limit of the average particle diameter.

In this embodiment, using a PtCo alloy for the electrode catalyst can improve the initial performance of the fuel cell. Herein, setting the molar ratio of Pt to Co in the PtCo alloy to 11 or less:1 can further increase the mass activity of the electrode catalyst. In addition, setting the molar ratio of Pt to Co in the PtCo alloy to 4 or greater: 1 can further suppress elution of Co. Thus, setting the molar ratio of Pt to Co in the PtCo alloy to 4 to 11:1 can further improve the initial performance and durability performance of the fuel cell. More preferably, the molar ratio of Pt to Co is 5 to 9:1, for example. It is also possible to define a new range by appropriately combining the aforementioned upper limit and lower limit of the molar ratio.

In addition, setting the average particle diameter of the PtCo alloy to less than or equal to 4.1 nm can further increase the mass activity of the electrode catalyst. Further, setting the average particle diameter of the PtCo alloy to greater than or equal to 3.5 nm can retain a given electrochemically active surface area (ECSA). The ECSA retention rate can be used as an index of the durability performance. Thus, setting the average particle diameter of the PtCo alloy to 3.5 to 4.1 nm can further improve the initial performance and durability performance of the fuel cell. More preferably, the average particle diameter of the PtCo alloy is 3.6 nm to 4.0 nm, for example. It is also possible to define a new range by appropriately combining the aforementioned upper limit and lower limit of the average particle diameter.

The degree of dispersion of the PtCo alloy supported on the solid carbon carrier is, when measured through small-angle X-ray scattering (SAXS), preferably less than or equal to 44%, more preferably, less than or equal to 40%, or particularly preferably, less than or equal to 36%. The degree of dispersion measured through small-angle X-ray scattering can be used as an index of the uniformity of the PtCo alloy. When the degree of dispersion is less than or equal to 44%, the performance of the fuel cell can be further improved. The lower limit of the degree of dispersion is 5% or 10%, for example. It is also possible to define a new range by appropriately combining the aforementioned upper limit and lower limit of the degree of dispersion.

The degree of dispersion measured through small-angle X-ray scattering can be calculated using analysis software. Examples of analysis software include nano-solver (produced by Rigaku Corporation).

The amount of the PtCo alloy supported on the solid carbon carrier is, for example, preferably 47.7 to 53.6% by weight, more preferably, 48.0 to 52.9% by weight, or particularly preferably, 49.1 to 51.5% by weight with respect to the total weight of the solid carbon carrier and PtCo alloy. It is also possible to define a new range by appropriately combining the aforementioned upper limit and lower limit of the range of the supported amount.

The amount of Pt supported on the solid carbon carrier is, for example, preferably 46.5 to 49.9% by weight, more preferably, 47.1 to 49.1% by weight, or particularly preferably, 47.3 to 48.7% by weight with respect to the total weight of the solid carbon carrier and the PtCo alloy. It is also possible to define a new range by appropriately combining the aforementioned upper limit and lower limit of the supported amount. It is also possible to set the supported amount of Pt to a small amount, such as 10 to 50% by weight, or a large amount, such as 50 to 90% by weight, for example.

In an embodiment of the present invention, the electrode catalyst is subjected to acid treatment under appropriate conditions (70 to 90° C.). Therefore, elution of Co is suppressed. Specifically, the amount of Co eluted from the electrode catalyst which is subjected to acid treatment is, under specific conditions (conditions where a 20 mL sulfuric acid solution and 0.5 g electrode catalyst are put in a sample bottle together with a stir bar, and are dispersed while being mixed with a stirrer, and then are mixed at the room temperature for 100 hours), preferably less than or equal to 115 ppm, more preferably, less than or equal to 40 ppm, or particularly preferably, less than or equal to 30 ppm. The lower limit of the amount of Co eluted may be 0 ppm or 5 ppm, for example. It is also possible to define a new range by appropriately combining the aforementioned upper limit and lower limit of the amount of Co eluted.

<Fuel Cell>

An embodiment of the present invention relates to a fuel cell that comprises fuel cell electrodes (hereinafter simply referred to as "electrodes") including the aforementioned electrode catalyst and an ionomer, and an electrolyte.

Examples of ionomers include Nafion (registered trademark) DE2020, DE2021, DE520, DE521, DE1020, and DE1021 produced by DuPont and Aciplex (registered trademark) SS700C/20, SS900/10, and SS1100/5 produced by Asahi Kasei Corporation.

Examples of fuel cells include a polymer electrolyte fuel cell (PEFC), a phosphoric acid fuel cell (PAFC), a molten carbonate fuel cell (MCFC), a solid oxide fuel cell (SOFC), an alkaline fuel cell (AFC), and a direct fuel cell (DFC). Preferably, the fuel cell is a polymer electrolyte fuel cell, though not particularly limited thereto.

An electrode including the aforementioned electrode catalyst may be used as either a cathode or an anode, or may be used as both.

The fuel cell may further include separators. Forming a cell stack by stacking single cells each having a membrane electrode assembly (MEA), which includes a pair of electrodes (a cathode and anode) and an electrolyte membrane, and a pair of separators sandwiching the membrane electrode assembly can obtain high power.

<Method for Producing Fuel Cell Electrode Catalyst>

An embodiment of the present invention relates to a method for producing the aforementioned electrode catalyst, and specifically relates to a method for producing a fuel cell electrode catalyst that comprises a supporting step of causing Pt and Co to be supported on a solid carbon carrier, and an alloying step of alloying Pt and Co supported on the solid carbon carrier.

In the supporting step, Pt and Co are supported at a molar ratio of preferably 2.5 to 6.9:1, or more preferably, 3.1 to 5.7:1. Part of Co will be removed in the acid treatment step described below. Therefore, in the supporting step, Co is supported in a larger amount than that in a preferable molar ratio of Pt and Co in an electrode catalyst of a final product. Using an electrode catalyst produced with the adoption of such a molar ratio can further improve the initial performance and durability performance of the fuel cell.

In the alloying step, Pt and Co are alloyed at preferably 700 to 900° C., or more preferably, 750 to 850° C. Using an electrode catalyst produced with the adoption of such an alloying temperature can further improve the initial performance and durability performance of the fuel cell.

Preferably, the production method in this embodiment further comprises an acid treatment step of subjecting the PtCo alloy supported on the solid carbon carrier to acid treatment.

In the acid treatment step, the PtCo alloy supported on the solid carbon carrier is subjected to acid treatment at preferably 70 to 90° C., or more preferably, 75 to 85° C. Performing acid treatment at such a temperature can sufficiently remove Co that does not contribute to reactions. Accordingly, elution of Co can be suppressed.

Examples of acids that are used in the acid treatment step include inorganic acids (nitric acid, phosphoric acid, permanganic acid, sulfuric acid, and hydrochloric acid), organic acids (acetic acid, malonic acid, oxalic acid, formic acid, citric acid, and lactic acid).

The materials, products, their characteristics, and the like in the production method in this embodiment, have been already described in the section of <Fuel cell electrode catalyst>. The description in the aforementioned section will be referenced as appropriate.

EXAMPLES

Although the present invention will be described in further detail below using examples and comparative examples, the technical scope of the present invention is not limited thereto. It should be noted that the examples and comparative examples should not be distinguished based on whether or not they are encompassed in the scope of the appended claims. Embodiments that were able to obtain particularly favorable results are described as examples and the other embodiments are described as comparative examples.

<Production of Electrode Catalyst>

Example 1

Supporting step: DENKA BLACK (1.0 g: Denka Company Limited.) was dispersed in pure water (41.6 mL). Then, a dinitrodiammine platinum nitric acid solution containing platinum (1.0 g) (JP 4315857 B: produced by CATALER CORPORATION) was dropped to sufficiently soak in the DENKA BLACK. Then, ethanol (3.2 g) was added as a reducing agent to cause reduction and support. The resulting dispersion liquid was cleaned through filtration, and the thus obtained powder was dried to obtain a platinum-supported catalyst. Next, the amount of oxygen on the surface of the platinum-supported catalyst was reduced to less than or equal to 4% by weight, and cobalt (0.03 g) was supported on the catalyst such that the ratio (molar ratio) in the product became Pt:Co=7:1.

DENKA BLACK used in this example is solid carbon in which the crystal layer thickness (Lc) measured through X-ray diffraction is 19 Å, and the rate of the outer surface area based on t-Plot (which is the surface area of the outside of the particles calculated from the particle size) relative to the BET surface area determined through $N_2$ adsorption (t-Plot surface area/BET surface area) is 49.6%. It should be noted that hollow carbon has a t-Plot surface area/BET surface area of 28.1%.

Alloying step: the obtained PtCo-supported catalyst was alloyed at 800° C. under an argon atmosphere.

Acid treatment step: the alloyed PtCo-supported catalyst was subjected to acid treatment at 80° C. using 0.5 N nitric acid, whereby an electrode catalyst was obtained.

Examples 2 to 27, Comparative Examples 1 to 73

Electrode catalysts were produced through the same steps as those in Example 1 except that the Pt:Co (molar ratio), alloying temperature, and acid treatment temperature were changed.

The production conditions of Examples and Comparative Examples are shown in Tables 1 to 4.

TABLE 1

|  | Pt:Co (Molar Ratio) | Alloying Temperature (° C.) | Acid Treatment Temperature (° C.) |
|---|---|---|---|
| Comparative Example 1 | 3:1 | 600 | Without Acid Treatment |
| Comparative Example 2 |  |  | 70 |
| Comparative Example 3 |  |  | 80 |
| Comparative Example 4 |  |  | 90 |
| Comparative Example 5 |  |  | 95 |
| Comparative Example 6 |  | 700 | Without Acid Treatment |
| Comparative Example 7 |  |  | 70 |
| Comparative Example 8 |  |  | 80 |
| Comparative Example 9 |  |  | 90 |
| Comparative Example 10 |  |  | 95 |
| Comparative Example 11 |  | 800 | Without Acid Treatment |
| Comparative Example 12 |  |  | 70 |
| Comparative Example 13 |  |  | 80 |
| Comparative Example 14 |  |  | 90 |
| Comparative Example 15 |  |  | 95 |
| Comparative Example 16 |  | 900 | Without Acid Treatment |
| Comparative Example 17 |  |  | 70 |
| Comparative Example 18 |  |  | 80 |
| Comparative Example 19 |  |  | 90 |
| Comparative Example 20 |  |  | 95 |
| Comparative Example 21 |  | 1000 | Without Acid Treatment |
| Comparative Example 22 |  |  | 70 |
| Comparative Example 23 |  |  | 80 |
| Comparative Example 24 |  |  | 90 |
| Comparative Example 25 |  |  | 95 |

TABLE 2

|  | Pt:Co (Molar Ratio) | Alloying Temperature (° C.) | Acid Treatment Temperature (° C.) |
|---|---|---|---|
| Comparative Example 26 | 4:1 | 600 | Without Acid Treatment |
| Comparative Example 27 |  |  | 70 |
| Comparative Example 28 |  |  | 80 |
| Comparative Example 29 |  |  | 90 |
| Comparative Example 30 |  |  | 95 |
| Comparative Example 31 |  | 700 | Without Acid Treatment |
| <Example 10> |  |  | 70 |
| <Example 11> |  |  | 80 |
| <Example 12> |  |  | 90 |
| Comparative Example 32 |  |  | 95 |
| Comparative Example 33 |  | 800 | Without Acid Treatment |
| <Example 13> |  |  | 70 |
| <Example 14> |  |  | 80 |
| <Example 15> |  |  | 90 |
| Comparative Example 34 |  |  | 95 |
| Comparative Example 35 |  | 900 | Without Acid Treatment |
| <Example 16> |  |  | 70 |
| <Example 17> |  |  | 80 |
| <Example 18> |  |  | 90 |
| Comparative Example 36 |  |  | 95 |
| Comparative Example 37 |  | 1000 | Without Acid Treatment |
| Comparative Example 38 |  |  | 70 |
| Comparative Example 39 |  |  | 80 |
| Comparative Example 40 |  |  | 90 |
| Comparative Example 41 |  |  | 95 |

TABLE 3

|  | Pt:Co (Molar Ratio) | Alloying Temperature (° C.) | Acid Treatment Temperature (° C.) |
|---|---|---|---|
| Comparative Example 42 | 7:1 | 600 | Without Treatment |
| Comparative Example 43 |  |  | 70 |
| Comparative Example 44 |  |  | 80 |

TABLE 3-continued

|  | Pt:Co (Molar Ratio) | Alloying Temperature (° C.) | Acid Treatment Temperature (° C.) |
|---|---|---|---|
| Comparative Example 45 |  |  | 90 |
| Comparative Example 46 |  |  | 95 |
| Comparative Example 47 |  | 700 | Without Treatment |
| <Example 7> |  |  | 70 |
| <Example 8> |  |  | 80 |
| <Example 9> |  |  | 90 |
| Comparative Example 48 |  |  | 95 |
| Comparative Example 49 |  | 800 | Without Treatment |
| <Example 2> |  |  | 70 |
| <Example 1> |  |  | 80 |
| <Example 3> |  |  | 90 |
| Comparative Example 50 |  |  | 95 |
| Comparative Example 51 |  | 900 | Without Acid Treatment |
| <Example 4> |  |  | 70 |
| <Example 5> |  |  | 80 |
| <Example 6> |  |  | 90 |
| Comparative Example 52 |  |  | 95 |
| Comparative Example 53 |  | 1000 | Without Treatment |
| Comparative Example 54 |  |  | 70 |
| Comparative Example 55 |  |  | 80 |
| Comparative Example 56 |  |  | 90 |
| Comparative Example 57 |  |  | 95 |

TABLE 4

|  | Pt:Co (Molar Ratio) | Alloying Temperature (° C.) | Acid Treatment Temperature (° C.) |
|---|---|---|---|
| Comparative Example 58 | 11:1 | 600 | Without Treatment |
| Comparative Example 59 |  |  | 70 |
| Comparative Example 60 |  |  | 80 |
| Comparative Example 61 |  |  | 90 |
| Comparative Example 62 |  |  | 95 |
| Comparative Example 63 |  | 700 | Without Treatment |
| <Example 19> |  |  | 70 |
| <Example 20> |  |  | 80 |
| <Example 21> |  |  | 90 |
| Comparative Example 64 |  |  | 95 |
| Comparative Example 65 |  | 800 | Without Treatment |
| <Example 22> |  |  | 70 |
| <Example 23> |  |  | 80 |
| <Example 24> |  |  | 90 |
| Comparative Example 66 |  |  | 95 |
| Comparative Example 67 |  | 900 | Without Treatment |
| <Example 25> |  |  | 70 |
| <Example 26> |  |  | 80 |
| <Example 27> |  |  | 90 |
| Comparative Example 68 |  |  | 95 |
| Comparative Example 69 |  | 1000 | Without Treatment |
| Comparative Example 70 |  |  | 70 |
| Comparative Example 71 |  |  | 80 |
| Comparative Example 72 |  |  | 90 |
| Comparative Example 73 |  |  | 95 |

<MEA Evaluation>

The electrode catalysts produced in Examples and Comparative Examples were dispersed in an organic solvent, and the resulting dispersion liquids were applied to Teflon (registered trademark) sheet to form electrodes. The electrodes were bonded together with a polymer electrolyte membrane sandwiched therebetween, using hot press, and diffusion layers were disposed on opposite sides thereof, whereby a single cell for a solid polymer electrolyte fuel cell was formed.

The cell temperature was set to 80° C. and the relative humidity of the opposite electrodes was set to 100%, and then, cyclic voltammetry (CV) and IV measurement were conducted using an evaluation system for single cell performance (produced by TOYO Corporation).

Regarding CV, potential scan was conducted five times in the range of 0.05 to 1.2 V at a rate of 100 mV/s, and ECSA (electrochemical surface area per unit mass of Pt) was calculated from the amount of electric charge in the $H_2$ adsorbed region in the 5th CV.

Figure 2:
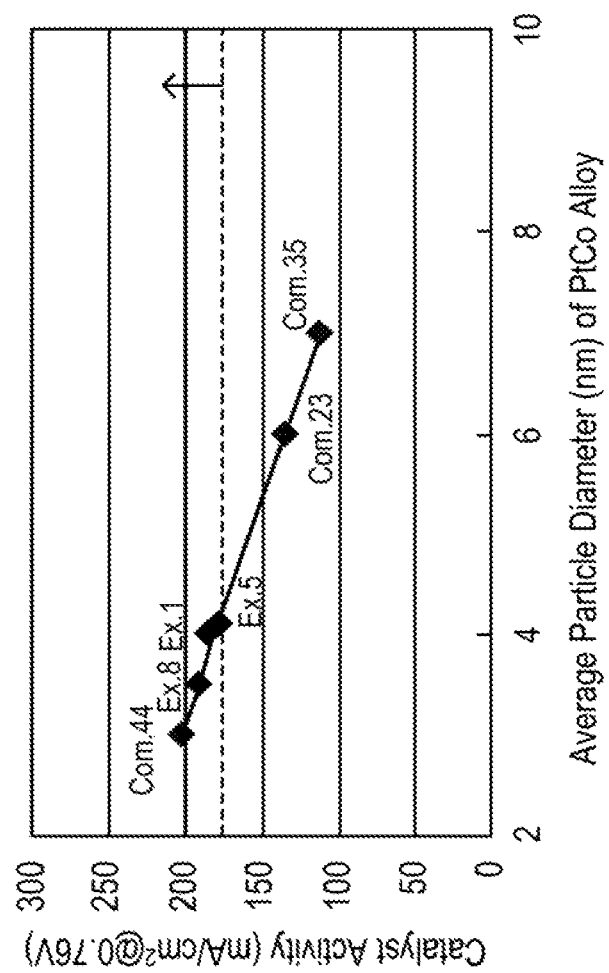
FIG. 2 illustrates the relationship between the average particle diameter of a PtCo alloy and catalyst activity.

Regarding the IV measurement, current was controlled as appropriate in the range of 0.01 to 1.0 Å/cm$^2$. The value of current per unit mass of Pt at 0.76 V was defined as the catalyst activity. For example, FIG. 1 and FIG. 2 depict performance when the same amount of the catalytic metal is supported on a unit area.

<Average Particle Diameter of PtCo Alloy>

The average particle diameter of the PtCo alloy was calculated from the intensity of a peak indicated by the Pt metal alone in the XRD chart measured using X-ray diffraction (XRD) that complies with JIS K 0131.

<Amount of Co Eluted>

A 20 mL sulfuric acid solution and 0.5 g electrode catalyst were put in a sample bottle together with a stir bar, and were dispersed while being mixed with a stirrer, and then were mixed at the room temperature for 100 hours. After that, the mixed liquid was solid-liquid separated (filtered), and the Co concentration in the filtrate was measured using ICP.

<Proton Resistance>

After the IV measurement of the single cell, protons were calculated using an alternating-current impedance method.

<Result 1>

FIG. 1 illustrates the relationship between the Pt/Co molar ratio and catalyst activity.

The plots in FIG. 1 correspond to, sequentially from the left,
Comparative Example 13 (Pt/Co molar ratio: 3, catalyst activity: 253 mA/cm² at 0.76 V);
Example 14 (Pt/Co molar ratio: 4, catalyst activity: 200 mA/cm² at 0.76 V);
Example 1 (Pt/Co molar ratio: 7, catalyst activity: 185 mA/cm² at 0.76 V);
Example 23 (Pt/Co molar ratio: 11, catalyst activity: 175 mA/cm² at 0.76 V); and Comparative Example 86 (Pt/Co molar ratio: 15, catalyst activity: 165 mA/cm² at 0.76 V).

The catalyst activity required for an electrode catalyst mounted on an FC vehicle is greater than or equal to 175 mA/cm² at 0.76 V. Therefore, the Pt/Co molar ratio is preferably less than or equal to 11. Meanwhile, as is clear from FIG. 4, in Comparative Example 13 in which the Pt/Co molar ratio is 3, the amount of Co eluted is large. Thus, a preferable Pt/Co molar ratio is 4 to 11.

<Result 2>

FIG. 2 illustrates the relationship between the average particle diameter of the PtCo alloy and catalyst activity. In addition, FIG. 3 illustrates the relationship between the average particle diameter of the PtCo alloy and ECSA retention rate.

Figure 3:
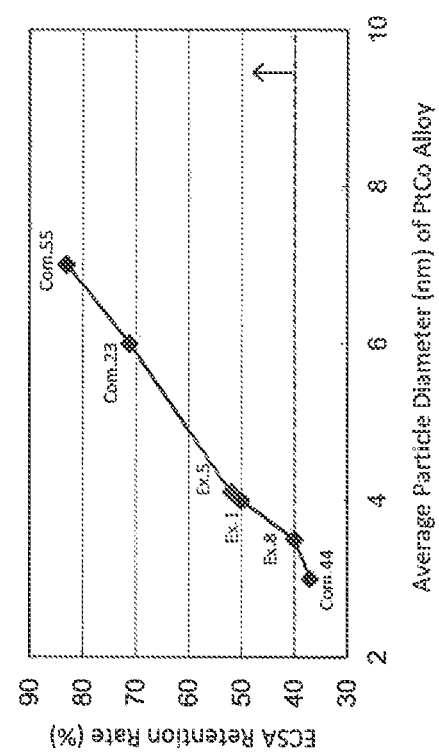
FIG. 3 illustrates the relationship between the average particle diameter of a PtCo alloy and ECSA retention rate.

The plots in FIGS. 2 and 3 correspond to, sequentially from the left,
Comparative Example 44 (average particle diameter: 3 nm, catalyst activity: 203 mA/cm² at 0.76 V, ECSA retention rate: 37%);
Example 8 (average particle diameter: 3.5 nm, catalyst activity: 191 mA/cm² at 0.76 V, ECSA retention rate: 40%);
Example 1 (average particle diameter: 4 nm, catalyst activity: 185 mA/cm² at 0.76 V, ECSA retention rate: 50%);
Example 5 (average particle diameter: 4.1 nm, catalyst activity: 178 mA/cm² at 0.76 V, ECSA retention rate: 52%);
Comparative Example 23 (average particle diameter: 6 nm, catalyst activity: 135 mA/cm² at 0.76 V, ECSA retention rate: 71%); and
Comparative Example 55 (average particle diameter: 7 nm, catalyst activity: 113 mA/cm² at 0.76 V, ECSA retention rate: 83%).

As described above, the catalyst activity required for an electrode catalyst mounted on an FC vehicle is greater than or equal to 175 mA/cm² at 0.76 V. Therefore, the average particle diameter of the PtCo alloy is preferably less than or equal to 4.1 nm. In addition, the ECSA retention rate required for the electrode catalyst is greater than or equal to 40%. Therefore, the average particle diameter of the PtCo alloy is preferably greater than or equal to 3.5 nm. Thus, a preferable average particle diameter of the PtCo alloy is 3.5 to 4.1 nm.

<Result 3>

Figure 4:
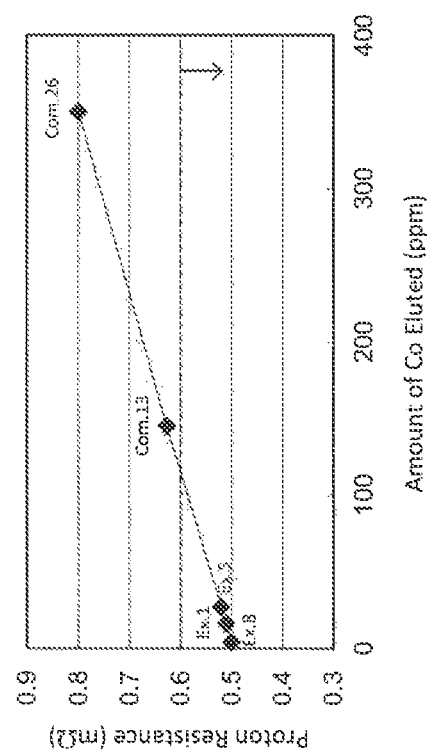
FIG. 4 illustrates the relationship between the amount of Co eluted and proton resistance.

FIG. 4 illustrates the relationship between the amount of Co eluted and proton resistance.

The plots in FIG. 4 correspond to, sequentially from the left,
Example 8 (the amount of Co eluted: 4 ppm, proton resistance: 0.50 mΩ·13 cm²);
Example 1 (the amount of Co eluted: 16 ppm, proton resistance: 0.51 mΩ·13 cm²);
Example 5 (the amount of Co eluted: 27 ppm, proton resistance: 0.52 mΩ·13 cm²);
Comparative Example 13 (the amount of Co eluted: 145 ppm, proton resistance: 0.63 mΩ·13 cm²); and
Comparative Example 26 (the amount of Co eluted: 350 ppm, proton resistance: 0.80 mΩ·13 cm²).

The proton resistance required for the electrode catalyst is less than or equal to 0.6 mΩ. Thus, a preferable amount of Co eluted is less than or equal to 115 ppm.

All publications, patents, and patent applications that are cited in this specification are all incorporated by reference into this specification.

The invention claimed is:

1. A fuel cell electrode catalyst comprising:
    a solid carbon carrier,
    wherein the solid carbon is a carbon in which the rate of the outer surface area based on t-Plot relative to the BET surface area is greater than or equal to 40%; and
    an alloy of platinum and cobalt supported on the carrier,
    wherein the alloy is subjected to acid treatment to elute cobalt,
    wherein a molar ratio of platinum to cobalt in the alloy is 7 to 11:1,
    wherein an average particle diameter of the alloy is 3.5 to 4.1 nm, and
    wherein an amount of cobalt to be eluted is less than or equal to 115 ppm.

2. The fuel cell electrode catalyst according to claim 1, wherein a degree of dispersion of the alloy measured through small-angle X-ray scattering is less than or equal to 44%.

3. A fuel cell comprising the fuel cell electrode catalyst according to claim 1.

4. The fuel cell according to claim 3, wherein a degree of dispersion of the alloy measured through small-angle X-ray scattering is less than or equal to 44%.

5. The fuel cell electrode catalyst according to claim 1, wherein the acid treatment is performed at 70 to 90° C.

6. The fuel cell electrode catalyst according to claim 1, wherein the average particle diameter of the solid carbon carrier is less than or equal to 30 μm and greater than or equal to 0.01 μm.

7. The fuel cell electrode catalyst according to claim 1, wherein the average particle diameter of the solid carbon carrier is less than or equal to 30 μm and greater than or equal to 0.1 μm.

8. The fuel cell electrode catalyst according to claim 1, wherein the average particle diameter of the solid carbon carrier is less than or equal to 13 μm and greater than or equal to 0.01 μm.

9. The fuel cell electrode catalyst according to claim 1, wherein the average particle diameter of the solid carbon carrier is less than or equal to 13 μm and greater than or equal to 0.1 μm.

10. The fuel cell electrode catalyst according to claim 1, wherein the average particle diameter of the solid carbon carrier is less than or equal to 10 μm and greater than or equal to 0.1 μm.

* * * * *